United States Patent

Parker

[15] 3,697,671

[45] Oct. 10, 1972

[54] ELECTRIC CABLES

[72] Inventor: Herbert William Mansfield Parker, Zebbug, England

[73] Assignee: Pyrotenax Limited, Durham, England

[22] Filed: March 3, 1971

[21] Appl. No.: 120,618

[30] Foreign Application Priority Data

Feb. 27, 1970 Great Britain............9,688/70

[52] U.S. Cl..................174/115, 174/27, 174/102 P, 174/113 R, 174/118
[51] Int. Cl..............................................H01b 7/32
[58] Field of Search...174/115, 107, 104, 102 R, 102 P, 174/108, 113 R, 118, 27, 105 R, 106 R

[56] References Cited

UNITED STATES PATENTS

| | | | |
|---|---|---|---|
| 3,334,177 | 8/1967 | Martin | 174/113 R X |
| 2,886,631 | 5/1959 | Muller | 174/115 X |
| 2,056,085 | 9/1936 | Alles | 174/115 UX |

FOREIGN PATENTS OR APPLICATIONS 1,515,802   10/1969   Germany..................174/115

*Primary Examiner*—Lewis H. Myers
*Assistant Examiner*—A. T. Grimley
*Attorney*—Webb, Burden, Robinson & Webb

[57] ABSTRACT

An electric power or communication cable has at least one core comprising an insulated conductor of aluminum or an aluminum-based alloy of high conductivity, a plastics sheath and, incorporated in the cable, a mineral insulated cable of a cross-section that is small in comparison with the overall cross-section of the cable. The mineral insulated cable has a sheath of aluminum or an aluminum-based alloy, is located outside the cable core or cores, and is adapted to indicate when the sheath of the mineral insulated cable has corroded to a sufficient extent to permit ingress of moisture therethrough. The mineral insulated cable may be embedded in the plastics sheath or it may replace one or more elements of a concentric neutral conductor of aluminum or an aluminum-based alloy.

12 Claims, 1 Drawing Figure

PATENTED OCT 10 1972
3,697,671
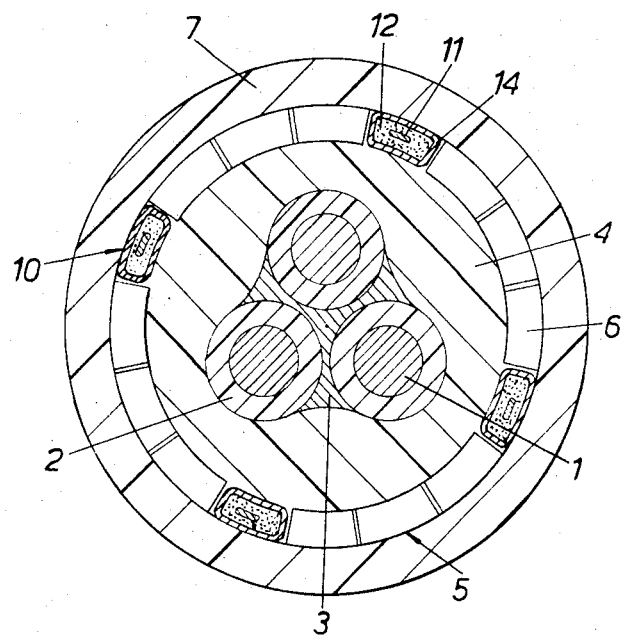
Inventor
HERBERT WILLIAM MANSFIELD PARKER
By Webb Burden
Robinson Webb
Attorneys

ELECTRIC CABLES

This invention relates to electric power or communication cables incorporating an auxiliary signalling circuit adapted to operate an alarm when the cable is severely damaged.

In electric power cables of protective multiple earthing systems the neutral conductor of a power cable is also used for earthing purposes by connecting the neutral conductor to earth at a number of locations along the cable route and it is the normal practice to use in protective multiple earthing systems, power cables having a concentric earthed return neutral conductor. In one form of cable that is being increasingly used in such systems the core conductor or core conductors and the concentric neutral conductor are made of aluminum or an aluminum-based alloy of high conductivity and the insulation of the core conductor or conductors and the outer sheathing of the cable are made of plastics material. This form of plastics insulated power cable has the disadvantage that if the cable is ruptured or is otherwise damaged to an extent to permit ingress of moisture through the damaged plastics sheathing and damaged plastics core insulation, the resultant corrosion of the concentric earthed return neutral conductor of aluminum or an aluminum-based alloy and of the core conductor or core conductors of the same material might not be detected until a fault occurs.

The present invention has for its object the provision of a plastics sheathed power or communication cable incorporating one or more conductors which are suitable for connection in an alarm circuit which will eventually operate whenever the power or communication cable has been damaged to such an extent that moisture that has entered the cable will cause corrosion of a core conductor of aluminum or an aluminum-based alloy.

In accordance with the invention we provide an electric power or communication cable having at least one core comprising an insulated conductor of aluminum or an aluminum-based alloy of high conductivity and enclosing the core or cores a plastics sheath wherein a mineral insulated cable, which has a sheath of aluminum or an aluminum-based alloy and is of a cross-section that is small in comparison with the overall cross-section of the cable, is incorporated in the cable outside the cable core or cores, preferably embedded in the plastics sheath, the mineral insulated cable being adapted to indicate when the sheath of the mineral insulated cable has corroded to a sufficient extent to permit ingress of moisture therethrough.

The term "mineral insulated cable" means a cable comprising a metal sheath enclosing one or more conductors which is or are separated from the sheath (and from each other when there is more than one conductor) by a compacted inorganic powder, usually magnesium oxide.

The location of the mineral insulated cable is such that in the event of the power or communication cable being ruptured or otherwise damaged to a sufficient extent to permit ingress of moisture through the damaged plastics sheath into the cable, it can be used to indicate that the sheath of the mineral insulated cable has corroded sufficiently to permit ingress of moisture into the mineral insulated cable before the core conductor or core conductors can be seriously affected by the ingress of moisture. The conductor or at least one of the conductors of the mineral insulated cable can be connected to a detector circuit and can carry a signal indicating that the sheath of the mineral insulated cable has corroded sufficiently to permit ingress of moisture. Alternatively, the insulation resistance of the mineral insulated cable can be measured at regular intervals, a substantial drop in the insulation resistance at any time indicating the presence of moisture in the mineral insulation.

Where a power cable includes a concentric neutral conductor comprising metal elements of aluminum or an aluminum-based alloy of high conductivity applied as a continuous helical lapping or with periodically reversing lay, a mineral insulated cable may replace one or more elements of the concentric neutral conductor or may be embedded in the plastics sheath outside the concentric neutral conductor.

Although as indicated above the principal object of the present invention is to protect an electric power or communication cable having a core conductor or core conductors and in some instances a neutral conductor of aluminum or an aluminum-based alloy of high conductivity against serious damage by corrosion, it will be appreciated that the or a conductor of the mineral insulated cable can be connected to an alarm circuit that will operate whenever the power or communication cable is cut or otherwise severely damaged, either accidentally or intentionally. For this reason it may in some circumstances be advantageous to distribute several mineral insulated cables at spaced intervals around the periphery of the cable, for example in the case of a power cable having a concentric neutral conductor four mineral insulated cables can be used to replace four elements of the concentric neutral conductor spaced at intervals of 90°.

The or each mineral insulated cable may be flattened to a cross-sectional shape approximating to that of a strip without any detrimental effect on its corrosion-detecting performance and such a flattened mineral insulated cable is preferably used to replace a strip of a concentric neutral conductor comprising a continuous helical lapping of strips of aluminum or an aluminum-based alloy of high conductivity.

The invention also includes a protective multiple earth cable installation incorporating an electric power cable in accordance with the invention. In a preferred installation the conductor or at least one of the conductors of the or a mineral insulated cable of the power cable is connected to a detector circuit for indicating the presence of moisture in the power cable.

An example of a three-core electric power cable in accordance with the invention suitable for use in a protective multiple earth cable installation will now be described with reference to the accompanying drawing which shows a cross-sectional view of the cable.

The power cable comprises three aluminum core conductors 1 each individually insulated with an extruded covering 2 of polyvinyl chloride, the insulated core conductors being helically laid up together about a preformed core 3 of plastics material and embedded in an overall extruded insulating covering 4 of polyvinyl chloride. Surrounding the insulating covering 4 is a concentric neutral conductor 5 comprising strips 6 of aluminum and four circumferentially spaced flattened mineral insulated cables 10 applied as a continuous helical lapping. Each mineral insulated cable 10 has a cross-section that is small in comparison with the overall cross-section of the cable and comprises an aluminum conductor 11 embedded in and insulated from an aluminum sheath 14 by compacted magnesium oxide 12. The concentric neutral conductor 5 is enclosed by an extruded sheath 7 of polyvinyl chloride.

When the power cable is incorporated in a protective multiple earth cable installation the conductor 11 of at least one of the mineral insulated cables 10 is connected to a detector circuit for indicating the presence of moisture in the power cable. The conductor 11 of at least one of the other mineral insulated cables 10 is preferably connected to an alarm circuit that will operate whenever the power cable is cut or otherwise severely damaged, either accidentally or intentionally.

A power or communication cable of the present invention has the important advantage that it provides for an early warning of corrosion of a core conductor of aluminum or an aluminum-based alloy before the corrosion can develop to such an extent as to cause a fault in the cable.

What I claim as my invention is:

1. An electric cable having at least one core comprising an insulated conductor of a material selected from the group of materials consisting of aluminum and aluminum-based alloys of high conductivity and, enclosing the core or cores, a plastics sheath, wherein a mineral insulated cable, which has a sheath of a material selected from the group of materials consisting of aluminum and aluminum-based alloys and is of a cross-section that is small in comparison with the overall cross-section of the cable, is incorporated in the cable outside the cable core or cores and can be used to indicate when the sheath of the mineral insulated cable has corroded to a sufficient extent to permit ingress of moisture therethrough, thereby to provide a warning before the or a core conductor can be seriously affected by the ingress of moisture.

2. An electric cable as claimed in claim 1, wherein the mineral insulated cable is embedded in the plastics sheath.

3. An electric cable as claimed in claim 2, wherein several mineral insulated cables are embedded at peripherally spaced intervals in the plastics sheath.

4. An electric cable as claimed in claim 1, wherein the sheath of the mineral insulated cable is of the same material as that of the core conductor or conductors.

5. An electric cable as claimed in claim 1, wherein the mineral insulated cable is flattened to a cross-sectional shape approximating to that of a strip without any detrimental effect on its corrosion detecting performance.

6. An electric power cable having at least one core comprising an insulated conductor, a concentric neutral conductor comprising metal elements applied about the core or cores, and a plastics sheath, at least a metal element of the neutral conductor and the or a core conductor being of a material selected from the group of materials consisting of aluminum and aluminum-based alloys of high conductivity, wherein a mineral insulated cable, which has a sheath of a material selected from the group of materials consisting of aluminum and aluminum-based alloys and is of a cross-section that is small in comparison with the overall cross-section of the cable, replaces at least one element of the concentric neutral conductor and can be used to indicate when the sheath of the mineral insulated cable has corroded to a sufficient extent to permit ingress of moisture therethrough, thereby to provide a warning before the or a core conductor can be seriously affected by the ingress of moisture.

7. An electric power cable as claimed in claim 6, wherein several mineral insulated cables replace peripherally spaced elements of the concentric neutral conductor.

8. An electric power cable as claimed in claim 6, in which the concentric neutral conductor comprises a continuous helical lapping of strips, wherein at least one strip of the concentric neutral conductor is replaced by a mineral insulated cable, flattened to a cross-sectional shape approximating to that of a strip without any detrimental effect on its corrosion-detecting performance.

9. An electric power cable having at least one core comprising an insulated conductor, a concentric neutral conductor comprising metal elements applied about the core or cores, and a plastics sheath, at least a metal element of the neutral conductor and the or a core conductor being of a material selected from the group of materials consisting of aluminum and aluminum-based alloys of high conductivity, wherein a mineral insulated cable, which has a sheath of a material selected from the group of materials consisting of aluminum and aluminum-based alloys and is of a cross-section that is small in comparison with the overall cross-section of the cable, is embedded in the plastics sheath outside of the concentric neutral conductor and can be used to indicate when the sheath of the mineral insulated cable has corroded to a sufficient extent to permit ingress of moisture therethrough, thereby to provide a warning before the or a core conductor can be seriously affected by the ingress of moisture.

10. An electric power cable as claimed in claim 9, wherein several mineral insulated cables are embedded at peripherally spaced intervals in the plastics sheath.

11. A protective multiple earth cable installation incorporating an electric power cable having at least one core comprising an insulated conductor, a concentric neutral conductor comprising metal elements applied about the core or cores, and a plastics sheath, at least a metal element of the neutral conductor and the or a core conductor being of a material selected from the group of materials consisting of aluminum and aluminum-based alloys of high conductivity, wherein a mineral insulated cable, which has a sheath of a material selected from the group of materials consisting of aluminum and aluminum-based alloys and is of a cross-section that is small in comparison with the overall cross-section of the cable, replaces at least one element of the concentric neutral conductor and can be used to indicate when the sheath of the mineral insulated cable has corroded to a sufficient extent to permit ingress of moisture therethrough, thereby to provide a warning before the or a core conductor can be seriously affected by the ingress of moisture.

12. A protective multiple earth cable installation as claimed in claim 11, wherein a conductor of the mineral insulated cable is connected to a detector circuit for indicating the presence of moisture in the power cable.

* * * * *